Patented Apr. 26, 1938

2,115,382

UNITED STATES PATENT OFFICE 2,115,382

METHOD OF CANNING DRIED FRUITS

Walter R. Campbell and Vincent B. Alling, Vancouver, Wash.

No Drawing. Application March 4, 1937,
Serial No. 129,081

2 Claims. (Cl. 99—186)

This invention relates to improvements in methods of canning dried fruits, and pertains particularly to an improved method of packing or canning dried prunes.

The present invention has for its primary object to provide an improved and novel method of packing dried fruits, especially dried prunes, in juice and sirup, whereby the fruit will be ready for table use immediately upon opening, and the usual difficulties encountered in canning such fruits such as the swelling and the perforation of the can and rotting of the fruit, is avoided.

Another object of the invention is to provide an improved method of canning fruits, particularly prunes, in such a way as to retain all of the soluble fruit sugars and volatile constituents in the sirup and juice in which the fruit is sealed, thus avoiding the losses incident to the present methods of canning such fruits wherein the same are processed or swelled in an open water bath prior to the canning and where such bath water is discarded.

A still further object of the invention is to provide an improved method of canning dried fruits by which there results a product which more closely resembles the fresh fruit than is obtainable by following the present canning methods.

In carrying out the present invention the dried fruit, and particularly dried prunes, are placed in a clear water sterilizing bath, the water having previously been brought to a temperature of approximately 210° F. The fruit is allowed to remain in this water a sufficient length of time to effect sterilization and thorough cleansing, preferably about three minutes.

Following the sterilizing step, the fruit is removed from the bath and is run through a cold water bath. By cold water is meant water of average or room temperature or as drawn from the tap.

Following the cold water bath step the fruit is then sorted and graded by any suitable procedure, as to size and quality.

The next step is to pack the graded fruit in cans or receptacles in which they are to be placed on the market. These may be the standard receptacles numbered 1, 2½ and 10, and whatever the size being filled the quantity of fruit going into the can is accurately previously determined relative to the can size by determination of the swelling capacity of the fruit, so that the fruit after having absorbed the sirup, later added, and having swollen fully, will fill the cans to the extent required by Government regulations and give when opened for use the full weight required. Ordinarily prunes or other fruit put into the can before the same is siruped, either fail to come up to the weight standard required or, if the quantity put in is too great initially, it will swell to such an extent as to strain the can seams and either burst the same or open them sufficiently to allow air to enter and the fruit to spoil.

After the cans have been packed with the required amount of the fruit, they are supplied with the sirup. This siruping process is carried on at ordinary room temperature and a sugar sirup is used which is governed as regards density or concentration in accordance with the type and kind of dried fruit being packed, but the sirup used will be of sufficient sugar content to comply with the Government regulations at the time that the pack is completed. In packing prunes particularly, the sirup used will not be of the same density as sirups required for other types of dried fruit, because of the fact that dried prunes are richer in sugar content than most other types of fruits. After the canned fruit has been siruped, the cans are sealed under vacuum by suitable sealing machines.

As a variant of the foregoing siruping and sealing step, the fruit may be supplied, after being put into the cans, with a sirup which is preheated to a temperature of from 160° to 180° F. and the cans will then be sealed immediately so that the necessary vacuum will be established therein through the contraction which will naturally come about as the vapors in the can cool and condense.

Following the sealing of the cans the same are placed in a retort or other suitable receptacle where the contents may be cooked and the cans maintained under pressure. The degree of temperature employed for cooking will, of course, vary in accordance with the size of can being handled. Other cooking methods may be employed such as by the use of a rotary cooker or an open cooking apparatus. This step requires only that the packed fruit be put through some method of cooking so that the product is completely cooked while it is sealed in the can and in the sirup in which it will remain until opened.

Following the cooking process, the cans are put through a cooling process where the temperature is reduced under pressure, which will result in the restoring of the contents to normal temperature without causing the cans to swell or twist. While this is the preferred method of cooling the cans and contents, the cooling may be accomplished by transferring the cans from the cooker to an open retort where the temperature can be gradually lowered.

After the cans have been restored to normal or room temperature, the same are labeled, ready for distribution.

By following the method of canning as here outlined, dried fruits, and particularly dried prunes, can be successfully packed in sirup and will reach the consumer in perfect condition and retaining all of their fruit sugars and other constituents which go to give flavor to the fruit. Heretofore packers have been unsuccessful in canning dried prunes because the process employed was not properly worked out to avoid perforation and spoilage of the fruit.

In the cooking operation the cooking temperature is preferably about 250° F. and the pressure approximately fifteen pounds to the square inch.

What is claimed, is:

1. A continuous method of canning dried prunes whereby the fruit sugars and volatile constituents thereof are retained, which consists in placing the dried prunes in clear water having a temperaure slightly below boiling to quickly sterilize the prunes, immediately subjecting the sterilized prunes to a water bath having substantially a normal room temperature, then placing the prunes into a can, filling the can with unheated sugar sirup having a sugar content proportionate to the sugar content of the prunes and at once closing and sealing the can under vacuum, then cooking the prunes at a temperature of about 250° F. while sealed in the cans and in the sirup to effect absorption of the sirup by the prunes as well as the cooking of the same, and finally effecting the slow cooling of the can and contents.

2. A continuous method of canning dried prunes whereby the fruit sugars and volatile constituents thereof are retained, which consists in placing the dried prunes for a period of approximately three minutes in clear water having a temperature of at least 210° F. to effect sterilization and cleansing, immediately passing the sterilized prunes through a water bath having a temperature substantially the same as a normal room temperature, placing a prescribed weight of the prunes in a can of selected size, adding to the can unheated sugar sirup, the said prescribed weight of prunes relative to the can size being such that after the said sirup addition has been made and the prunes have absorbed the sirup the ultimate weight of the prunes will be such as to comply with legal requirements, then at once sealing the can under vacuum, rapidly cooking the contents of the sealed can by subjecting it to a temperature of about 250° F., and finally effecting the slow cooling of the can and contents.

VINCENT B. ALLING.
WALTER R. CAMPBELL.